United States Patent
Yu

(10) Patent No.: US 7,493,031 B2
(45) Date of Patent: Feb. 17, 2009

(54) AUTOMATIC FOCUSING MODULE

(75) Inventor: Tai-Cherng Yu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 312 days.

(21) Appl. No.: 11/282,786

(22) Filed: Nov. 18, 2005

(65) Prior Publication Data
US 2006/0133789 A1   Jun. 22, 2006

(30) Foreign Application Priority Data
Dec. 17, 2004   (CN)   ............ 2004 1 0077640

(51) Int. Cl.
G03B 17/00    (2006.01)

(52) U.S. Cl. .............. 396/72; 396/77; 396/79; 396/89; 396/90; 396/529

(58) Field of Classification Search ............ 396/72, 396/77, 79, 90, 529, 89
See application file for complete search history.

(56) References Cited

U.S. PATENT DOCUMENTS 4,303,324 A * 12/1981 Marcus ............ 396/133
4,601,539 A    7/1986 Watanabe
6,038,080 A *  3/2000 Schachar .......... 359/666
6,188,526 B1*  2/2001 Sasaya et al. ...... 359/666
6,618,208 B1*  9/2003 Silver ............. 359/666
2002/0018303 A1* 2/2002 Kojima et al. ...... 359/691
2002/0102102 A1* 8/2002 Watanabe et al. .... 396/89
2002/0191304 A1* 12/2002 Kitaoka et al. ..... 359/687
2003/0169399 A1* 9/2003 Smith ............. 351/98
2004/0252382 A1* 12/2004 Nagata ............ 359/691

FOREIGN PATENT DOCUMENTS

JP   7-151908   6/1995

* cited by examiner

Primary Examiner—W. B. Perkey
Assistant Examiner—Michael A Strieb
(74) Attorney, Agent, or Firm—Steven M. Reiss

(57) ABSTRACT

An automatic focusing module (100) includes a lens barrel (10), a first lens (11), a piezoelectric element (14), and a deformably adjustable lens (13). The first lens is disposed in the lens barrel. The piezoelectric element is installed in the lens barrel. The piezoelectric element is connected to a piezoelectric circuit. The deformably adjustable lens is disposed in the piezoelectric element.

8 Claims, 1 Drawing Sheet

AUTOMATIC FOCUSING MODULE

BACKGROUND OF THE INVENTION

1. Field of the Invention

The present invention generally relates to automatic focusing modules used in photography and imaging equipment and, more particularly, to an automatic focusing module for a digital camera.

2. Discussion of the Related Art

Currently, digital camera modules are included as a feature in a wide variety of portable electronic devices. Most portable electronic devices are becoming progressively more miniaturized over time, and digital camera modules are correspondingly becoming smaller and smaller. Nevertheless, in spite of the small size of a contemporary digital camera module, consumers still demand excellent imaging.

There are, in most of conventional photography and imaging equipment, focus adjusting mechanisms for taking high quality photos. A conventional focus adjusting mechanism includes a motor and a driving member. However, the conventional focus adjusting mechanism cannot be used in a miniaturized digital camera module for a portable electronic device. The use of the conventional focus adjusting mechanism is not feasible because the motor and the driving member need a rather large space to adjust focus. Such space simply is not available in a typical portable electronic device.

What is needed is an automatic focusing module which can be used in a miniaturized digital camera module for a portable electronic device.

SUMMARY OF THE INVENTION

An automatic focusing module includes a lens barrel, a first lens, a piezoelectric element, and a deformably adjustable lens. The first lens is disposed in the lens barrel. The piezoelectric element is installed in the lens barrel. The piezoelectric element is connected to a piezoelectric circuit. The deformably adjustable lens is disposed in the piezoelectric element.

Other objects, advantages and novel features will become more apparent from the following detailed description when taken in conjunction with the accompanying drawings.

BRIEF DESCRIPTION OF THE DRAWINGS

Many aspects of the automatic focusing module can be better understood with reference to the following drawings. The components in the drawings are not necessarily to scale, the emphasis instead being placed upon clearly illustrating the principles of the present automatic focusing module. Moreover, in the drawings, like reference numerals designate corresponding parts throughout the several views.

DETAILED DESCRIPTION OF THE EMBODIMENTS

Figure 1:
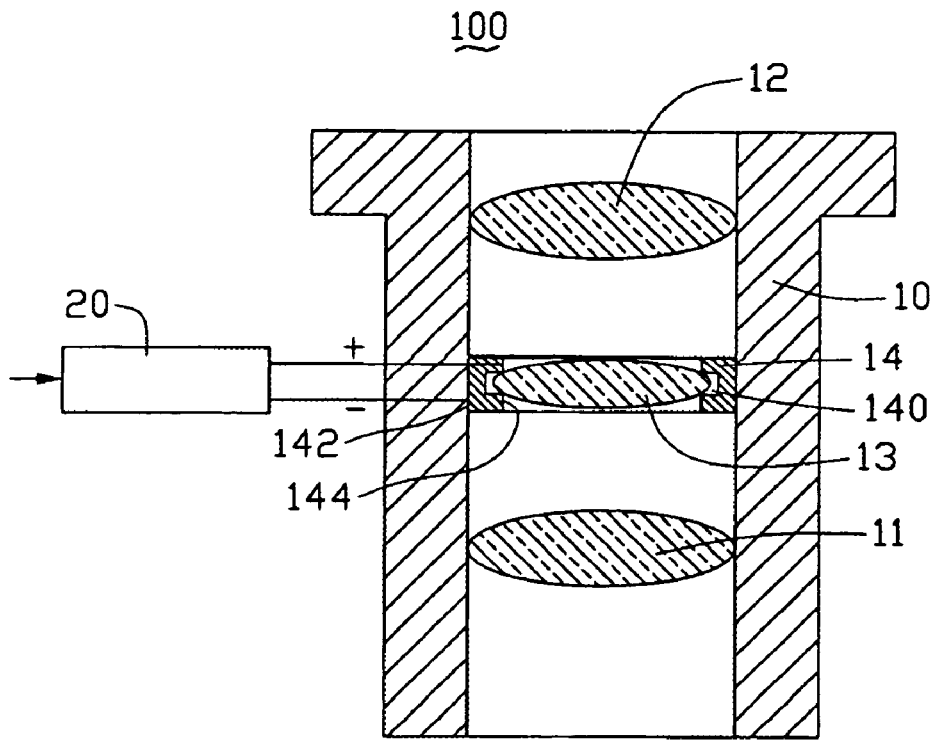
FIG. 1 is a schematic, partially cut-away view of an automatic focusing module in accordance with a preferred embodiment of the automatic focusing module, showing an initial state.

Referring to FIG. 1, an automatic focusing module 100 according to a preferred embodiment includes a lens barrel 10, a first lens 11, a second lens 12, a third lens 13, and a piezoelectric element 14. The first lens 11, the second lens 12, the third lens 13, and the piezoelectric element 14 are secured in the lens barrel 10. The third lens 13 and the piezoelectric element 14 are disposed between the first lens 11 and the second lens 12. It is to be understood that the third lens 13 and the piezoelectric element 14 can be disposed at other positions within the lens barrel 10. The first lens 11 and the second lens 12 are made of a material selected from a group consisting of transparent plastic and glass. The third lens 13 is usefully made of a transparent plastic. The transparent plastic is one or more material selected from the group consisting of polymethyl methacrylate, polycarbonate, and polydimethyl siloxane. The third lens 13 can advantageously be deformed along an axis or a radial direction, under an outside force.

The piezoelectric element 14 is annular and has an outside annulus 142 and an inside annulus 144. An annular groove 140 is defined on the inside annulus 144. The third lens 13 (i.e., the deformable, adjustable lens) is retained in the annular groove 140. The piezoelectric element 14 is secured in the lens barrel 10 with glue or another adhesive and/or by an interference fit, and the third lens 13 is secured in the annular groove 140 via similar means (e.g., adhesive and/or interference fit). The outside annulus 142 and the inside annulus 144 are respectively connected to a positive pole and a negative pole of a piezoelectric circuit 20. As such, the piezoelectric circuit 20 can provide an electric field to the piezoelectric element 14. The piezoelectric element 14 is advantageously made of a piezoelectric ceramic. The piezoelectric element 14 can produce a mechanical deformation S under the electric field of the piezoelectric circuit 20. The mechanical deformation S is in direct ratio with an electric field intensity E of the piezoelectric circuit 20, with a formula of $S=dE$. The coefficient d is a piezoelectric constant. The piezoelectric element 14 has a polarization direction. When polarization direction of the piezoelectric element 14 is same with the electric field direction of the piezoelectric circuit 20, the mechanical deformation S will enhance along the polarization direction, and vice versa.

Referring also to FIG. 1, when assembling the automatic focusing module 100, firstly, the third lens 13 is secured in the annular groove 140 of the piezoelectric element 14. Secondly, the first lens 11, the combination of the third lens 13 and the piezoelectric element 14, and the second lens 12 are installed, in turn, in the lens barrel 10. Thirdly, the first lens 11, the second lens 12, and the third lens 13 are adjusted to obtain an initial focus position. Fourthly, the piezoelectric element 14, the first lens 11, and the second lens 12 are secured in the lens barrel 10 by using glue or another adhesive. As such, the first lens 11 and the second lens 12 are stationary, constant-focus lenses.

Figure 2:
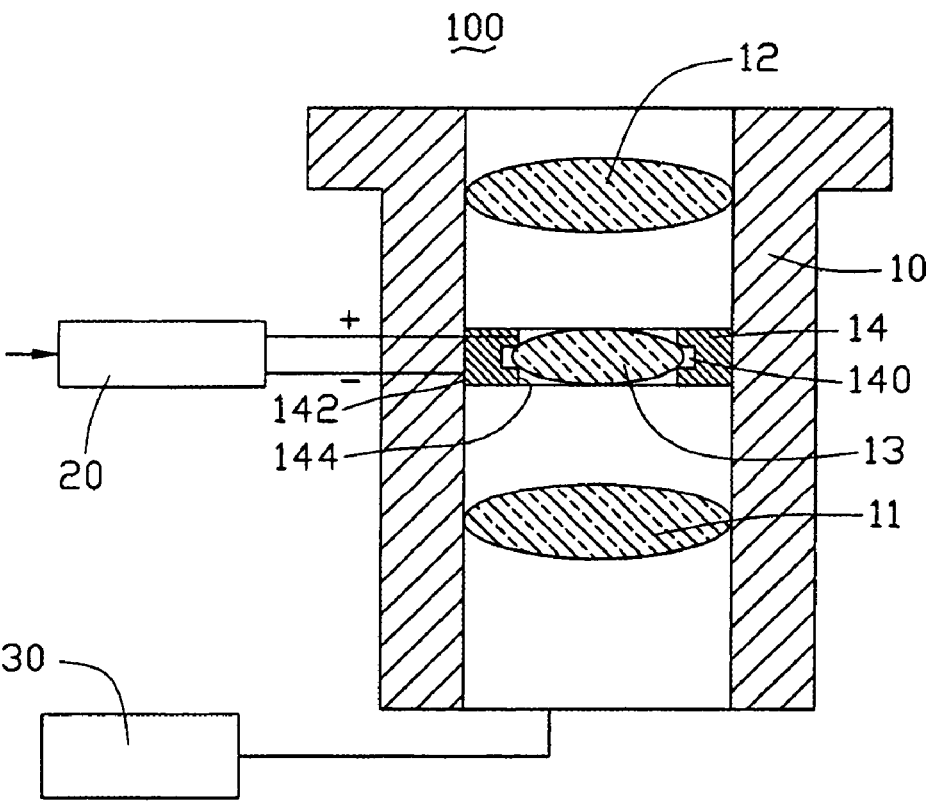
FIG. 2 is a schematic, partially cut-away view of an automatic focusing module in FIG. 1, showing a focusing state.

Referring to FIGS. 1 and 2, in use, when a focus-error detecting element 30 detects a focus error, the piezoelectric circuit 20 provides electric field to the piezoelectric element 14. The piezoelectric element 14 deforms under the electric field of the piezoelectric circuit 20. As a consequence, the piezoelectric element 14 compresses the third lens 13 in the annular groove 140. Then, the focus of the third lens 13 changes, and the combined focus of the first lens 11, the second lens 12, and the third lens 13 accordingly changes. If the focus-error detecting element 30 cannot detect a focus error, the focusing process is completed.

It is to be understood that more than one adjustable lens/piezoelectric element combination could be provided to permit for more complex focusing. Such a combination could be used in addition to or in lieu of one or more stationary lenses. It is also to be understood that any various combination of stationary lenses could be employed. It is also envisaged that one adjustable lens/piezoelectric element combination could be used by itself, without incorporating any other lenses. The number and combination of lenses to be used may be dictated by such factors as the cost, the amount of available space, and the degree of focusing capability desired.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An automatic focusing module, comprising:
a cylindrical lens barrel defining an inner barrel surface;
at least one constant focus lens disposed in the lens barrel;
an annular piezoelectric element having an inner annulus and an outer annulus, the annular piezoelectric element installed in the lens barrel with the outer annulus contacting the inner barrel surface, the piezoelectric element being connected to a piezoelectric circuit, the inner annulus of the piezoelectric element having an annular groove defined therein; and
a deformably adjustable lens disposed in the annular groove of the piezoelectric element;
wherein the piezoelectric element applies a force to deform the adjustable lens.

2. The automatic focusing module as claimed in claim 1, wherein the piezoelectric element is comprised of a piezoelectric ceramic.

3. The automatic focusing module as claimed in claim 1, wherein the first lens is made of one of a glass and a transparent plastic.

4. The automatic focusing module as claimed in claim 3, wherein the first lens is made of a transparent plastic, the transparent plastic being comprised of at least one material selected from the group consisting of polymethyl methacrylate, polycarbonate, and polydimethyl siloxane.

5. The automatic focusing module as claimed in claim 1, wherein the deformably adjustable lens is made of a transparent plastic.

6. The automatic focusing module as claimed in claim 5, wherein the transparent plastic is at least one material selected from the group consisting of polymethyl methacrylate, polycarbonate, and polydimethyl siloxane.

7. The automatic focusing module as claimed in claim 1, wherein the piezoelectric element is secured in the lens barrel by using an adhesive.

8. The automatic focusing module as claimed in claim 1, wherein the outside annulus and the inside annulus are connected to a positive pole and a negative pole of the piezoelectric circuit, respectively.

* * * * *